(12) United States Patent
Yin et al.

(10) Patent No.: US 11,080,236 B1
(45) Date of Patent: Aug. 3, 2021

(54) HIGH THROUGHPUT EMBEDDING GENERATION SYSTEM FOR EXECUTABLE CODE AND APPLICATIONS

(71) Applicants: DEEPBITS TECHNOLOGY INC., Riverside, CA (US); THE REGENTS OF THE UNIVERSITY OF CALIFORNIA, Oakland, CA (US)

(72) Inventors: Heng Yin, Riverside, CA (US); Xunchao Hu, Riverside, CA (US); Sheng Yu, Riverside, CA (US); Yu Zheng, Riverside, CA (US)

(73) Assignees: DEEPBITS TECHNOLOGY INC., Riverside, CA (US); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 17/198,312

(22) Filed: Mar. 11, 2021

Related U.S. Application Data

(63) Continuation of application No. 15/930,321, filed on May 12, 2020.

(60) Provisional application No. 62/875,830, filed on Jul. 18, 2019.

(51) Int. Cl.
*G06K 9/00* (2006.01)
*G06K 9/62* (2006.01)
*G06F 16/14* (2019.01)
*G06F 17/16* (2006.01)

(52) U.S. Cl.
CPC ............ *G06F 16/148* (2019.01); *G06F 17/16* (2013.01); *G06K 9/6202* (2013.01); *G06K 9/6215* (2013.01); *G06K 9/6247* (2013.01); *G06K 9/6296* (2013.01)

(58) Field of Classification Search
CPC ..... G06F 16/148; G06F 17/16; G06K 9/6202; G06K 9/6215; G06K 9/6247; G06K 9/6296
See application file for complete search history.

(56) References Cited

U.S. PATENT DOCUMENTS

2019/0239100 A1* 8/2019 Pandey .................. H04L 41/16

FOREIGN PATENT DOCUMENTS

WO  WO 2008/086323  *  7/2008  ............... G06K 9/62

OTHER PUBLICATIONS

Massarelli et al, "Investigating Graph Embedding Neural Networks with Unsupervised Features Extraction for Binary Analysis," 2016, NDSS: Network and Distributed System Security Symposium, 11 pages (Year: 2016).*

* cited by examiner

*Primary Examiner* — David F Dunphy
(74) *Attorney, Agent, or Firm* — Xsensus LLP

(57) ABSTRACT

A novel high-throughput embedding generation and comparison system for executable code is presented in this invention. More specifically, the invention relates to a deep-neural-network based graph embedding generation and comparison system. A novel bi-directional code graph embedding generation has been proposed to enrich the information extracted from code graph. Furthermore, by deploying matrix manipulation, the throughput of the system has significantly increased for embedding generation. Potential applications such as executable file similarity calculation, vulnerability search are also presented in this invention.

14 Claims, 7 Drawing Sheets

HIGH THROUGHPUT EMBEDDING GENERATION SYSTEM FOR EXECUTABLE CODE AND APPLICATIONS

CROSS-REFERENCE TO RELATED APPLICATIONS

The present application is a continuation of U.S. patent application Ser. No. 15/930,321, filed May 12, 2020, currently pending, which claims priority to U.S. Provisional Application No. 62/875,830, filed on Jul. 18, 2019, the disclosures of both of which are hereby incorporated by reference in their entireties into the present disclosure.

STATEMENT REGARDING FEDERALLY SPONSORED RESEARCH OR DEVELOPMENT

This invention was made with government support under Contract No. 1719175 awarded by the National Science Foundation and under Contract No. N00014-17-1-2893 awarded by the Office of Naval Research. The government has certain rights in the invention.

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

Given two binary functions, we would like to detect whether they are semantically equivalent or similar. This problem is known as "binary code similarity detection" or "binary code search", which has many security applications, such as plagiarism detection, malware detection, vulnerability search, etc. E.g., "binary code similarity detection" can be applied on determination if new incoming code binaries are variants of known examples of malware.

In cybersecurity industry, to process the huge volume of executable code (e.g., malware, firmware images, etc.), security practitioners face an increasing need to quickly detect similar functions directly in executable code for different purposes (e.g., malware classification, vulnerability search, etc.).

However, the existing binary code similarity detection approaches are far from being scalable to handle an enormous amount of executable code in the wild. The normal work flow of code search is to first disassemble the binary code and then extract features from them, and finally compare the similarity between candidates. There have been plenty of works that try to detect similar code in binary executables, from simple syntax-based solutions like n-gram, to control-flow graph based approaches like BinDiff, to the most expensive symbolic execution and theorem proving like BinHunt. These methods all lack in accuracy, and most of them are fairly expensive and do not satisfy the needs for processing large volume of malware samples and search over a large code base.

BRIEF SUMMARY OF THE INVENTION

As will be described in greater detail below, the instant disclosure generally relates to systems and methods for a high throughput embedding generation system for executable code and applications.

One of the features of the present invention is to provide a high-throughput system for embedding generation and comparison that can be used for potential applications such as plagiarism detection, malware detection, vulnerability search, etc.

Another feature of the present invention is to deploy bi-directional graph embedding network in embedding generation.

Another feature of the present invention is to stack the BACFGs of functions to speed up the embedding generation process for the whole system.

Another feature of the present invention is to use matrix manipulation to speed up the intermediate process for similarity comparison that allows high throughput for the whole system.

Another feature of the present invention is to apply PCA (Principal Component Analysis) on embeddings to calculate the similarity of executable code.

Another feature of the present invention is to combine high-throughput embedding generation and comparison with condition formula comparison to implement precise and scalable vulnerability search.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION OF THE PREFERRED EMBODIMENT

Figure 1:
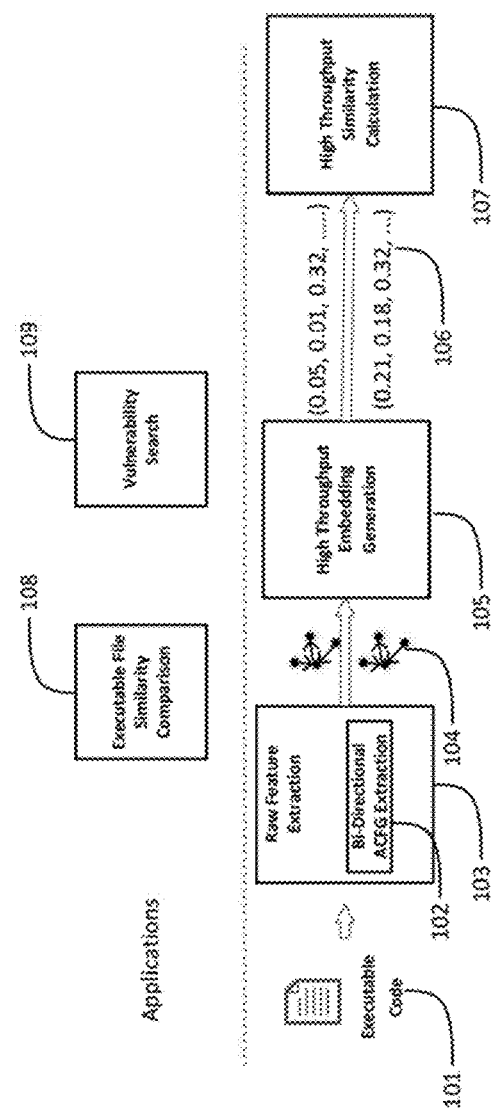
FIG. 1 illustrates the general flow of the whole system according to various embodiments of the present invention.

The invention can be implemented in numerous ways, including as a process; an apparatus; a system; a composition of matter; a computer program product embodied on a computer readable storage medium, which may be non-transitory; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Given two binary functions, we would like to detect whether they are similar. This problem is known as "binary code similarity detection" or "code search" which has many security applications, such as plagiarism detection, malware detection, vulnerability search, etc.

Vulnerability search is one of the applications and is becoming particularly critical and more crucial than ever in the discovery of vulnerabilities in IoT devices. A single bug at source code level may spread across hundreds or more devices that have diverse hardware architectures and software platforms. The study by Cui et al. showed that 80.4% of vendor-issued firmware is released with multiple known vulnerabilities, and many recently released firmware updates contain vulnerabilities in third party libraries that have been known for over eight years.

Another application of code similarity detection is malware analysis. In particular, it can be used to classify malware into different malware families which is one of the essential functionalities provided by antivirus software.

The normal workflow of code search is to first disassemble the binary code and then extract features from them, and finally compare the similarity between candidates. There have been plenty of works that try to detect similar code in binary executables, from simple syntax-based solutions like n-gram, to control-flow graph based approaches like BinDiff, to the most expensive symbolic execution and theorem proving like BinHunt.

Due to the huge volume of executable code (e.g., malware, firmware images, etc.), security practitioners face an increasing need to quickly detect similar functions directly in executable code for different purposes (e.g., malware classification, vulnerability search, etc.). In the present cybersecurity industry, the volume of binary programs analyzed by cybersecurity applications is huge (more than 900M, and more than 10M per month). Cybersecurity companies allocate tremendous amount of computing resources to handle such large volume of suspicious samples every day. However, the above mentioned code similarity detection approaches are far from being scalable to handle an enormous amount of executable code in the wild.

One promising approach to conduct binary code similarity detection has been proposed recently. It learns high-level feature representations from the control flow graphs (in short, code graph) and encode the graphs into embeddings (i.e., high dimensional numerical vectors). Then it uses embeddings to compare the similarity of functions extracted from binary code. However, the generation and comparison of embeddings is not scalable enough to handle large volume of code. To overcome this problem, a new high-throughput embedding generation and comparison system is presented herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing the preferred embodiments. FIG. 1 depicts the overview of the invention. The system takes executable code 101 as input. The raw feature extraction embodiment 103 generates Bi-Directional Attributed Control Flow Graph (BACFG) 104. The high-throughput embedding generation embodiment 105 takes the BACFG as input, and applies graph embedding to generate embeddings 106. Finally, the embeddings can be fed to high-throughput similarity calculation embodiment 107 for various applications. This invention also presents two applications of the approach: executable file similarity comparison 108 and vulnerability search 109.

The input executable code 101 includes but is not limited to Java bytecode, binary executable code of various architectures (e.g., X86, MIPS, ARM, etc.) as long as BACFG 104 can be constructed from the input with proper tools.

Raw features extracted by Raw Feature Extraction embodiment 103 can be implemented in many ways. Raw features include but are not limited to Control Flow Graph, Attributed Control Flow Graph, etc. This invention presents one implementation of raw feature: Bi-Directional Attributed Control Flow Graph (BACFG) 104 defined as follows.

Definition 1. (Bi-directional Attributed Control Flow Graph) The bi-directional attributed control flow graph, or BACFG in short, is a special directed graphs with two edges $G=<V,E_1,E_2,\varphi>$, where V is a set of basic blocks; $E_1 \subseteq V \times V$ is a set of edges representing the connections between these basic blocks, $E_2=E_1^T \subseteq V \times V$ is a set of edges representing the reversed connections between these basic blocks, and $\varphi:V \to \Sigma$ is the labeling function which maps a basic block in V to a set of attributes in.

Figure 2:
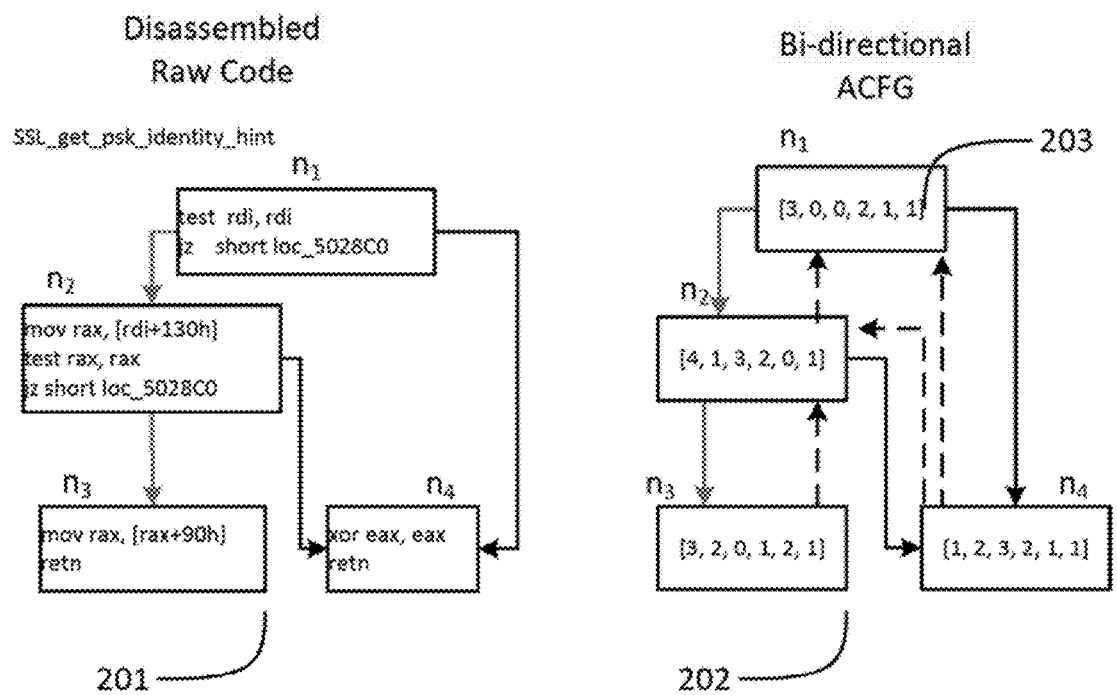
FIG. 2 illustrates an example of disassembled raw code and bi-directional ACFG.

Bi-directional ACFG extraction embodiment 102 can be implemented using different approaches. One approach relies on disassemblers such as IDA pro and Binary Ninja to disassemble the executable code 101. Every function in the executable code is recovered and its raw features (control flow graph, basic block information) are extracted. Finally, BACFG 104 is constructed from this information for every function in the executable code 101. FIG. 2 presents an example of constructing BACFG 104 from executable code. The disassembled raw code 201 is extracted using IDA pro, a commercial disassembler from a piece of OpenSSL executable code. It contains the control flow graph of function SSL_get_psk_identity_hint and basic block ($n_1$, $n_2$, $n_3$, $n_4$) information. 202 is the corresponding BACFG constructed for function SSL_get_psk_identity_hint. Every node in 201 represented in a set of attributes. The edges in 202 are kept in generated BACFG 202. The doted arrow line in 202 represents the reversed edges.

Figure 3:
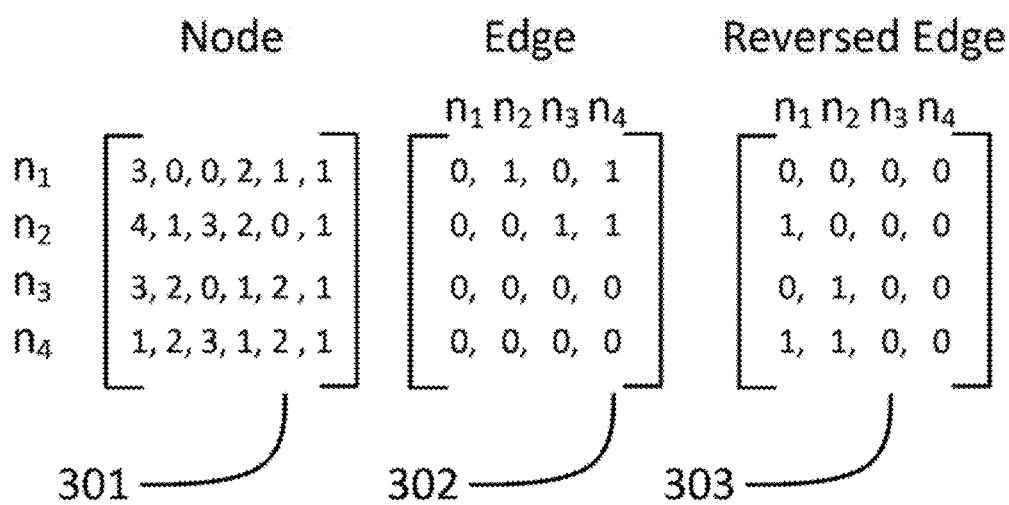
FIG. 3 illustrates the representations of bi-directional ACFG.

However, the generated BACFG 202 cannot be directly fed into graph embedding network to generate the embedding. To solve this problem, FIG. 3 presents one approach to store BACFG 104. This new approach applies three matrices to store the information of node, edge and reversed edges defined in BACFG 104. Every row in node matrix represents one node in BACFG. E.g., $n_1$ in 202 is the first row in node matrix 301. The edge and reversed edge in 202 information is represented using adjacent matrix 302, 303. Now these three matrices can be fed into graph embedding network 413 to generate the embedding. More specifically, BACFG is treated as two graphs $G_1$=<V,$E_1$> and $G_2$=<V,$E_2$>. $G_1$ and $G_2$ are fed into graph embedding network 413 to generate the embedding $e_1$ and $e_2$ respectively. Finally, the embedding of BACFG is calculated via ($e_1$+$e_2$)/2.

Graph embedding network 413 learns high-level feature representations from the control flow graphs (in short, code graphs) and encode (i.e., embed) the graphs into embeddings (i.e., high dimensional numerical vectors). It can be implemented in many ways. This invention presents an implementation based on an adapted neural network from Structure2Vec.

Denote a code graph as g=(V,E) where V and E are the sets of vertexes and edges respectively; furthermore, each vertex in the graph may have additional features $x_v$ which correspond to block level features in a code graph. The graph embedding network will first compute a p dimensional feature $\mu_v$ for each vertex v∈V, and then the embedding vector $\mu_g$ of g will be computed as an aggregation of the vertex embeddings.

More specifically, we denote N(v) as the set of neighbors of node v in graph g. Then one variant of the structure2vec network will initialize the embedding $\mu_v^{(0)}$ at each node as 0, and update the embeddings at each iteration as $$\mu_v^{(t+1)} = F(x_v, \Sigma_{u \in N(v)} \mu_u^{(t)}), \forall v \in V. \qquad (1)$$

In this fixed-point update formula, F is a generic nonlinear mapping.

$$F(x_v, \Sigma_{u \in N(v)} \mu_u) = \tanh(W_1 x_v + \sigma(\Sigma_{u \in N(v)} \mu_u)) \qquad (2)$$

where $x_v$ is a d-dimensional vector for graph node (or basic-block) level features, $W_1$ is a d×p matrix, and p is the embedding size as explained above.

The parameters $W_1$ are trained using the Siamese architecture. The Siamese architecture will use two identical graph embedding networks which join at the top. Each graph embedding network will take one code graph $f_i$ (i=1,2) as its input and outputs the embedding $\phi(f_i)$. The final outputs of the Siamese architecture is the cosine distance of the two embeddings. Furthermore, we will require that the code graphs from the same function compiled in different platforms or at different optimization levels to have similarity 1, while those compiled from different functions have similarity −1.

High Throughput Embedding Generation 105

It is fast to generate embedding for one single function (represented in code graph) each time. However, there are a huge volume of executable files that need to be processed every day. Generating embedding per function is too slow to handle such a large volume of code. To solve this problem, this invention presents an implementation of high-throughput embedding generation 105 by stacking the BACFGs of functions.

Given n BACFGs {$G_1$, $G_2$, ..., $G_n$} extracted from executable code and each is represented with the format illustrated in FIG. 3, this implementation stacks these n BACFGs as illustrated in 0 to generate embeddings in batch. Each BACFG is denoted as $G_i$=<$V_i$,$E_{1i}$,$E_{2i}$,$\varphi$>.

Stacked Node Matrix M1 401: Each row M1[i] represents one node depicted in 301. The nodes of n BACFGs are stacked in their original order, and form the new node matrix M1.

Stacked Edge Matrix M2 405: As illustrated in 405, the edge matrix is stacked following the main diagonal. It can also be implemented by stacking following the anti-diagonal.

Stacked Reversed Edge Matrix M3 409: As illustrated in 409, the reversed edge matrix is stacked following main diagonal. It can also be implemented by stacking following the anti-diagonal.

The stacked BACFGs are then fed into the graph embedding network 413 and the embeddings 416 415 414 of functions are calculated simultaneously. This approach almost improves the embedding generation performance by n times.

High-Throughput Similarity Calculation 107

The embedding of a function is actually a numeric vector. The distance of two numeric vectors can be used to calculate the similarity of functions. There are many algorithms to calculate the distance of vectors. This invention applies cosine similarity to calculate the distance. Given two vectors of attributes, A and B, the cosine similarity, cos(θ)), is represented using a dot product and magnitude as $$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \qquad (3)$$

It is fast to calculate the similarity of two functions. But in practice, the similarity comparison is usually applied on thousands or millions of functions. E.g., one common task is to find vulnerable functions in docker images. The executable code size is usually over 100 MB. There are approximately 102,400 functions if we assume the size per function is 1K (under estimated). To search one vulnerable function, it needs to conduct 102,400 comparisons. And that is only for one docker image and searching only one vulnerable function. In reality, there are thousands of vulnerable functions and docker images. Apparently, the aforementioned method are not practical.

To make this approach practical, this invention presents a new way to calculate the similarity of embeddings in batch. As illustrated FIG. 5, n embeddings 501 with (1×m) dimension are stacked together to generate a (n×m) matrix A 502. Each embedding $E_{fi}$ can be retrieved via A[i].

Figure 5:
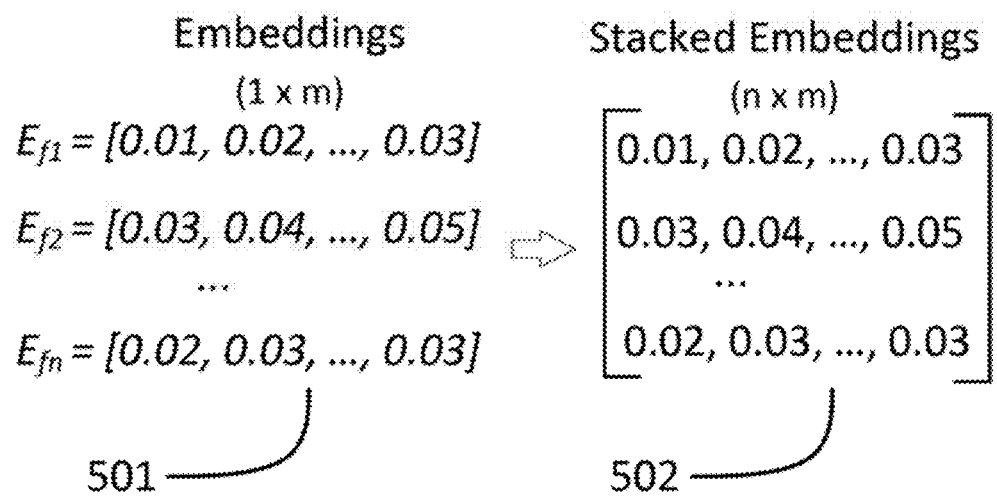
FIG. 5 illustrates the approach of stacking embeddings.

Given two groups of embeddings {$E_{fa1}$, $E_{fa2}$, ..., $E_{fan}$} and {$E_{fb1}$, $E_{fb2}$, ..., $E_{fbn}$}, this invention first stacks these embeddings as illustrated in FIG. 5 into two matrices A and B. The similarity of embeddings is calculated as $$S = \frac{AB^T}{\|A\|\|B\|^T} \qquad (4)$$

where S[i][k] is the cosine similarity of embedding A[i] and embedding B[k].

The above approach greatly improves the similarity comparison performance. In the test, it is only takes several seconds to conduct 100 million comparisons on a Desktop PC with Intel i7-4790.

Applications 1: Executable File Similarity Comparison

One application of the high-throughput embedding generation 105 and high-throughput similarity calculation 107 is executable file similarity comparison. The applications of executable file similarity comparison include but are not limited to malware classification, provenance, etc.

Figure 4:
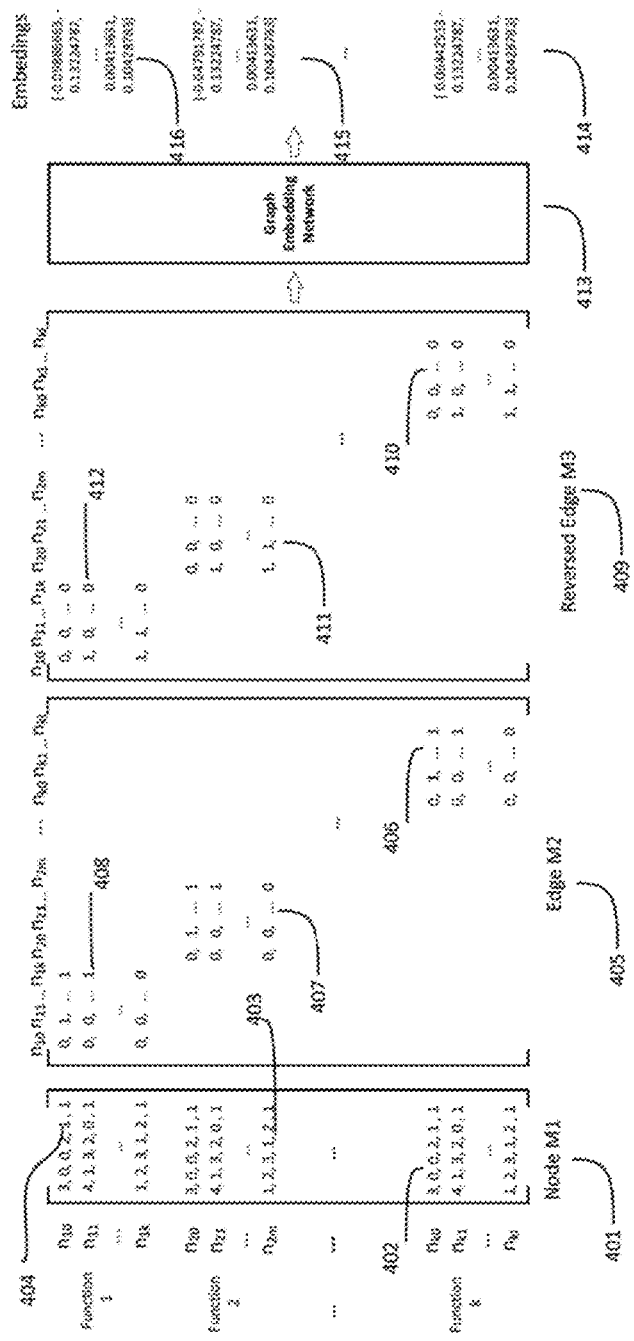
FIG. 4 illustrates the design of high-throughput embedding generation embodiment.
Figure 6:
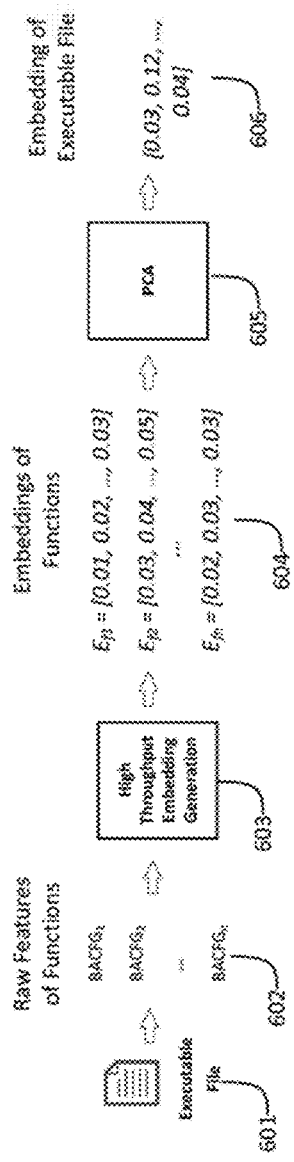
FIG. 6 illustrates the process of calculating the embedding of executable files.

This invention presents an approach to use embeddings of an executable file to compare the similarity. FIG. 6 illustrates the workflow. The input executable file 601 is disassembled to extract BACFGs 602 of every function using the approach described in 103. Then the high-throughput embedding generation 603 described in FIG. 4 is used to generate the embeddings $\{E_{f1}, E_{f2}, \ldots, E_{fn}\}$ for n functions extracted from the executable file. Finally, this invention applies Principal Component Analysis (PCA) 605 on function embeddings $\{E_{f1}, E_{f2}, \ldots, E_{fn}\}$ to generate the embedding of executable file 606 by reducing the functions embeddings to a fixed-length vector.

The embedding of the executable file is still a numeric vector. The distance of these numeric vectors can be used to calculate the similarity of executable files. This invention applies the high-throughput similarity calculation 107 discussed before to calculate the similarity of different executable files.

Applications 2: Known Vulnerability Search

Vulnerability detection is getting harder as code size and the number of third-party libraries used increase, especially when code is statically linked. A general approach is to treat a vulnerability as one or more vulnerable functions. Then the problem of vulnerability search is converted into the problem of searching semantically-equivalent functions in binary code.

Figure 7:
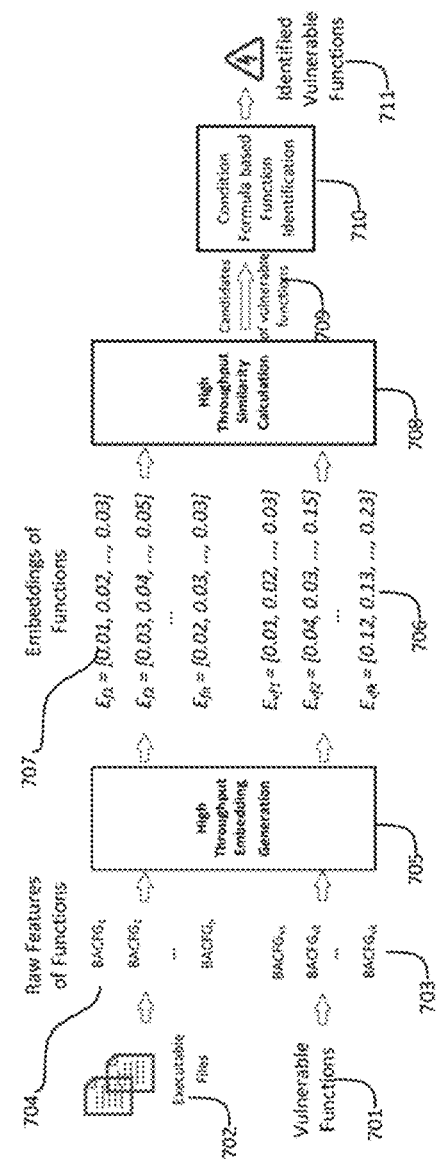
FIG. 7 illustrates the process of searching vulnerable functions in executable files.

The embodiment described in FIG. 7 presents an efficient known vulnerability search solution by applying the high-throughput embedding generation 105 and similarity calculation 106. The goal is to find vulnerable functions 701 in executable files 702. The basic idea is first to quickly get a short list of potential vulnerable functions using high-throughput embedding comparison. Then a conditional formula based function identification 710 is applied on the candidates list to find the vulnerable functions 711.

The executable files 701 and vulnerable functions are disassembled to extract BACFGs 702 of every function using the approach described in 103. Then the high-throughput embedding generation 705 described in FIG. 4 is used to generate the embeddings $\{E_{f1}, E_{f2}, \ldots, E_{fn}\}$ and $\{E_{vf1}, E_{vf2}, \ldots, E_{vfn}\}$ for vulnerable functions and functions extracted from the executable file. The high-throughput similarity calculation 798 embodiment compares $\{E_{vf1}, E_{vf2}, \ldots, E_{vfn}\}$ with $\{E_{f1}, E_{f2}, \ldots, E_{fn}\}$ to obtain the similarity score of every vulnerable function and the functions from executable files. This similarity score is then used to generate a vulnerable function candidate list [f1, f2, ..., fk] from functions extracted from executable files by selecting the top k most similar functions.

Since k is usually a small number (<20), expensive program analysis can be applied to exactly determine if the functions in candidate list are indeed vulnerable. The conditional formula based function identification embodiment 10 is implemented to identify the true vulnerable functions in candidate list.

Generally speaking, a conditional formula consists of an If-clause and a Then-clause, and each clause is a symbolic formula, describing under what condition (stated in the If-clause) a given action (in the Then-clause) will take place. A conditional formula explicitly captures two cardinal factors of a buggy code: (1) erroneous data dependencies, and (2) missing or incorrect condition checks. Instead of treating the vulnerable function as a whole, searching on structured conditional formulas can effectively localize the possibly vulnerable code logic. By contrasting conditional formulas between the vulnerable function and a target candidate, we can quickly diagnose whether the target is vulnerable or a false positive.

The embodiment 10 first utilizes a binary lifting tool (such as Binary Ninja) to convert vulnerable functions and the candidate list to the same higher-level intermediate representation (IR). Then it applies program analysis techniques on the IR to construct conditional formulas for every vulnerable function and candidate. The data dependency via pointers are carefully handled. Besides, not all the variables in a function are of interests. Action point selection is conducted to filter irrelevant variables. Then embodiment 09 matches functions by their unified conditional formulas. It can be implemented in many ways, such as a constraint solver. Finally, identified vulnerable functions 711 can be generated by removing the false positive candidates from [f1, f2, ..., fk].

Figure 8:
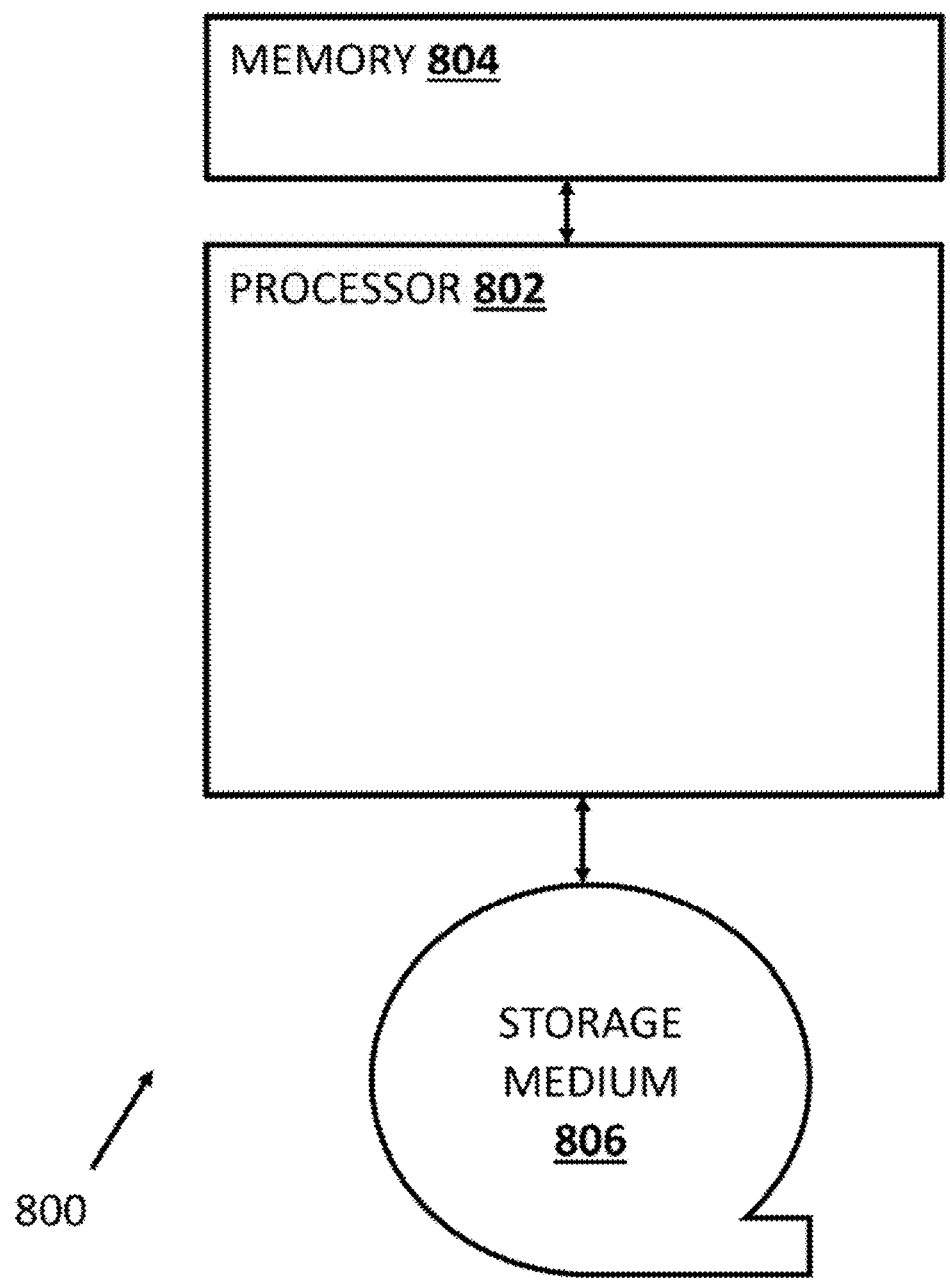
FIG. 8 illustrates an embodiment of a system in which the present invention can be implemented.

FIG. 8 illustrates an embodiment of a system 800 on which the present invention can be implemented. As noted above, the system 800 can include a processor 802 configured to execute instructions stored on and/or provided by a memory 804 coupled to the processor 802. The instructions can also be provided from a computer-readable storage medium 806.

What is claimed is:

1. A system for high-throughput embedding generation and comparison, comprising:
   circuitry configured to
   take executable code and extract Bi-directional Attributable Control Flow Graphs (ACFGs) of functions from the executable code;
   conduct high-throughput embedding generation to generate embeddings for the Bi-directional ACFGs;
   conduct high-throughput similarity comparison of the functions using the embeddings; and
   conduct the high-throughput similarity comparison to compare a similarity of a plurality of executable files by applying Principal Component Analysis on the embeddings.

2. The system of claim 1, wherein each of the Bi-directional ACFGs is a directed graph with two edges.

3. The system of claim 1, wherein the high-throughput embedding generation deploys stacked Bi-directional ACFGs to maximize a throughput of an embedding network.

4. They system of claim 1, wherein the circuitry is further configured to implement a graph embedding network to which the bi-directional ACFGs are input.

5. The system of claim 1, wherein the circuitry is configured to conduct the high-throughput similarity comparison using matrix manipulation.

6. The system of claim 5, wherein the circuitry is configured to implement the matrix manipulation by stacking function embedding vectors into matrix format, and processing the function embedding vectors in batches through one calculation to provide high speed cosine similarity calculation.

7. The system of claim 1, wherein the circuitry is configured to implement an executable file similarity comparison system using the high-throughput embedding generation and comparison.

8. The system of claim 7, wherein the circuitry is configured to conduct the principal component analysis on the embeddings of the functions extracted from the plurality of executable files to generate the embeddings of the executable files.

9. The system of claim 7, wherein the circuitry is configured to use cosine similarity of the embeddings of the executable files to calculate the similarity of the executable files.

10. The system of claim 1, wherein the circuitry is configured to implement a vulnerability search system using the high-throughput embedding generation and comparison.

11. The system of claim 10, wherein the circuitry is configured to use the high-throughput embedding generation and comparison to identify candidates list of vulnerable functions.

12. The system of claim 10, wherein the circuitry is configured to use condition formula comparison to identify true positive vulnerable functions in the candidates list.

13. A method for high-throughput embedding generation and comparison, compromising:
  taking executable code and extracting Bi-directional Attributable Control Flow Graphs (ACFGs) of functions from the executable code;
  conducting high-throughput embedding generation to generate embeddings for the Bi-directional AFCGs;
  conducting high-throughput similarity comparison of the functions using the embeddings; and
  conducting the high-throughput similarity comparison to compare a similarity of a plurality of executable files by applying Principal Component Analysis on the embeddings.

14. A non-transitory, computer-readable storage medium storing instructions that, when executed on a computer, control the computer to perform a method for high-throughput embedding generation and comparison, compromising:
  taking executable code and extracting Bi-directional Attributable Control Flow Graphs (ACFGs) of functions from the executable code;
  conducting high-throughput embedding generation to generate embeddings for the Bi-directional AFCGs;
  conducting high-throughput similarity comparison of the functions using the embeddings; and
  conducting the high-throughput similarity comparison to compare a similarity of a plurality of executable files by applying Principal Component Analysis on the embeddings.

* * * * *